July 1, 1924.
F. M. GREEN
1,499,980
FRAMEWORK FOR AIRCRAFT AND OTHER STRUCTURES
Filed Nov. 21, 1923
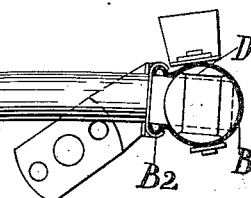
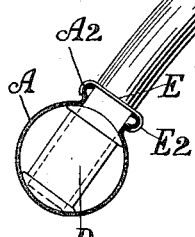
Fig. 1.
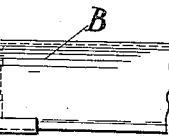
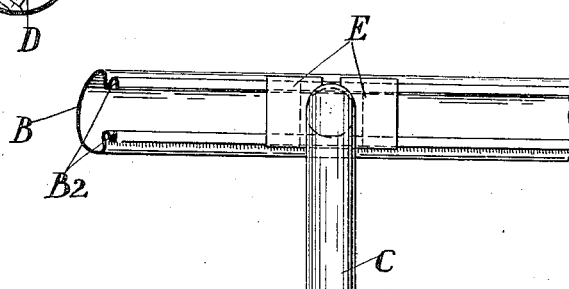
Fig. 3.
Fig. 2.
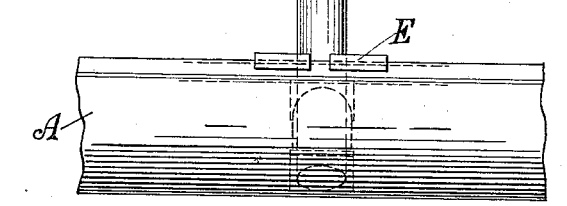
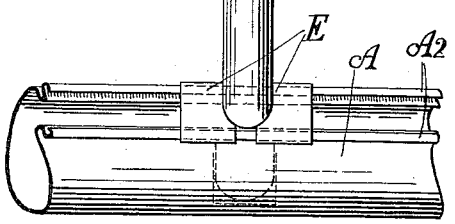
INVENTOR
Frederick M. Green
ATTORNEY.

Patented July 1, 1924.

1,499,980

UNITED STATES PATENT OFFICE.

FREDERICK MICHAEL GREEN, OF COVENTRY, ENGLAND, ASSIGNOR TO ARMSTRONG SIDDELEY MOTORS LIMITED, OF PARK SIDE, COVENTRY, ENGLAND.

FRAMEWORK FOR AIRCRAFT AND OTHER STRUCTURES.

Application filed November 21, 1923. Serial No. 676,146.

*To all whom it may concern:*

Be it known that I, FREDERICK MICHAEL GREEN, a subject of the King of England, residing at Coventry, in the county of Warwick, England, have invented certain new and useful Improvements in Framework for Aircraft and Other Structures, of which the following is a specification.

This invention relates to framework of the kind comprising one or more side or edge members to which are attached ribs, generally perpendicular thereto. The chief application of the invention is to the manufacture of the frames of the supporting or controlling surfaces of air craft. For example, in the case of an aeroplane wing there are the leading and trailing edge members to which the ends of the ribs or riblets are attached, and the invention is particularly applicable thereto.

The object of the invention is to provide a simple method of attaching the ribs to the edge members whereby sweating, soldering, riveting and other permanent attachments are dispensed with, so that a rib can easily be removed or its position altered when required.

In the accompanying drawings,

Figure 1 is a side elevation of part of an aeroplane wing embodying a riblet attached to edge members by means of this invention.

Figure 2 is a front elevation, and

Figure 3 is a plan of the same.

Like letters indicate like parts throughout the drawings.

In this construction, the front and rear edges are formed by channel section members A and B. Each channel is preferably almost circular in section, about 60 degrees of the complete circle being omitted. For example, it may be formed from a tube, or strip bent to tubular shape, with a gap of the required dimensions. The metal which normally would close this gap is flanged outwards at $A^2$ and $B^2$ approximately parallel to one another and to a radius, but the extreme edges of these flanges turn away from one another and are then rounded off inwards.

Each riblet C (or rib) has fixed upon the end a block D which constitutes a head and is parti-cylindrical or parti-spherical corresponding in diameter to the diameter of the tube of which the channel is formed.

Upon the flanges $A^2$ and $B^2$ slide clips E, each clip taking the form of a saddle the edges $E^2$ of which form ears which are bent down beneath the flanges so that the clips cannot come off the flanges but are free to slide along them.

In assembling, a clip E is first slipped along the flanges, then the riblet C is put into place, the head D sliding along the channel. Then a second clip E is slipped along the edge member. When the riblet is in the right position the two clips are moved towards one another and up against the riblet, causing the sides of the channel to approach one another and to grip tightly the parti-circular head.

It will be understood that any suitable number of ribs or riblets may be fitted by this invention and that any one can have its position changed or can easily be removed when required. There is no riveting or sweating, so that a very substantial attachment is obtained.

What I claim as my invention and desire to secure by Letters Patent of the United States is:—

1. In framework, an edge member of open channel section, a rib, a head on said rib lying in said channel, and means for pinching together the edges of the channel on each side of the rib.

2. In framework as claimed in claim 1, the combination of flanges on the channel section edge member and saddle shaped clips which slide upon the flanges and close them together slightly, substantially as set forth.

3. In framework as claimed in claim 1, the combination with an edge member of parti-circular section of a head of parti-cylindrical or parti-spherical contour, substantially as set forth.

In testimony whereof I affix my signature.

FREDERICK MICHAEL GREEN.